US011631025B2

(12) United States Patent
Sato

(10) Patent No.: US 11,631,025 B2
(45) Date of Patent: Apr. 18, 2023

(54) LEARNING APPARATUS, LEARNING METHOD, AND RECORDING MEDIUM

(71) Applicant: NEC Corporation, Tokyo (JP)

(72) Inventor: Atsushi Sato, Tokyo (JP)

(73) Assignee: NEC CORPORATION, Tokyo (JP)

( * ) Notice: Subject to any disclaimer, the term of this patent is extended or adjusted under 35 U.S.C. 154(b) by 973 days.

(21) Appl. No.: 15/536,783

(22) PCT Filed: Jan. 5, 2016

(86) PCT No.: PCT/JP2016/000015
§ 371 (c)(1),
(2) Date: Jun. 16, 2017

(87) PCT Pub. No.: WO2016/111241
PCT Pub. Date: Jul. 14, 2016

(65) Prior Publication Data
US 2017/0344908 A1 Nov. 30, 2017

(30) Foreign Application Priority Data
Jan. 7, 2015 (JP) .............................. JP2015-001271

(51) Int. Cl.
*G06N 20/00* (2019.01)
*G06F 40/242* (2020.01)

(52) U.S. Cl.
CPC ........... *G06N 20/00* (2019.01); *G06F 40/242* (2020.01)

(58) Field of Classification Search
CPC .............................. G06N 20/00; G06F 40/242
See application file for complete search history.

(56) References Cited

U.S. PATENT DOCUMENTS

2006/0112028 A1* 5/2006 Xiao ........................ G06N 3/08
706/15
2008/0255844 A1* 10/2008 Wu ....................... G10L 15/193
704/255
(Continued)

FOREIGN PATENT DOCUMENTS

| JP | 2011-203991 A | 10/2011 |
| WO | 2008/047835 A1 | 4/2008 |
| WO | 2014/136316 A1 | 9/2014 |

OTHER PUBLICATIONS

Laws, Florian, and Hinrich Schatze. "Stopping criteria for active learning of named entity recognition." Proceedings of the 22nd International Conference on Computational Linguistics-vol. 1. Association for Computational Linguistics, 2008. (Year: 2008).*
(Continued)

*Primary Examiner* — Li B. Zhen
*Assistant Examiner* — Henry Nguyen

(57) ABSTRACT

A learning apparatus includes: an update unit which updates a dictionary used by a classifier; a calculation unit which calculates, by using a dictionary updated and one or more samples with labeling being samples assigned with labels, a ratio to a number of the samples with labeling as a loss with respect to all the samples with labeling; and a determination unit which determines whether to update the dictionary, by using the loss, wherein, when the determination unit determines to update the dictionary, the update unit updates the dictionary by using the samples with labeling added with a new sample with labeling, and wherein the determination unit determines whether to update the dictionary, by using a loss calculated by using the updated dictionary and a loss calculated by using the dictionary before updating with respect to all the samples with labeling before adding the new sample with labeling.

6 Claims, 8 Drawing Sheets

(56) References Cited

U.S. PATENT DOCUMENTS

| | | |
|---|---|---|
| 2010/0023465 A1 | 1/2010 | Kuroiwa et al. |
| 2010/0217732 A1* | 8/2010 | Yang ............... G06N 20/00 706/21 |
| 2011/0022550 A1* | 1/2011 | Pennacchiotti ....... G06N 20/00 706/12 |
| 2011/0238605 A1 | 9/2011 | Tateno |
| 2014/0279716 A1 | 9/2014 | Cormack et al. |
| 2014/0365195 A1* | 12/2014 | Lahiri ................ G06N 3/02 703/12 |
| 2016/0012351 A1 | 1/2016 | Sato |

OTHER PUBLICATIONS

Nguyen, Minh Ha, Hussein A. Abbass, and Robert I. McKay. "Stopping criteria for ensemble of evolutionary artificial neural networks." Applied Soft Computing 6.1 (2005): 100-107. (Year: 2005).*

Michael Bloodgood, K.Vijay-Shanker, "A Method for Stopping Active Learning Based on Stabilizing Predictions and the Need for User-Adjustable Stopping", Proceedings of the Thirteenth Conference on Computational Natural Language Learning, USA, Association for Computational Linguistics, Jun. 2009, p. 39-47.

International Search Report for PCT Application No. PCT/JP2016/000015, dated Apr. 5, 2016.

English translation of Written opinion for PCT Application No. PCT/JP2016/000015.

\* cited by examiner

LEARNING APPARATUS, LEARNING METHOD, AND RECORDING MEDIUM

This application is a National Stage Entry of PCT/JP2016/000015 filed on Jan. 5, 2016, which claims priority from Japanese Patent Application 2015-001271 filed on Jan. 7, 2015, the contents of all of which are incorporated herein by reference, in their entirety.

TECHNICAL FIELD

The present invention relates to a learning apparatus, a classifier, a learning method, and a recording medium.

BACKGROUND ART

Learning is performed on a classifier used for causing a computer to recognize a pattern of a content such as voice and an image, by using a pattern sample. As a method of labeling the sample when a class to which each sample belongs (a correct-answer class) is not labeled to the sample, active learning is used.

In general, a sample with a least reliable discrimination result (i.e. most mistakable) is selected, and a user labels the selected sample with a correct-answer class. However, there is a problem that when to terminate the labeling work is uncertain. For example, NPL 1 describes a method of stopping active learning in accordance with stabilizing predictions.

Further, PTL 1 describes predicting a label with respect to a sample (content) not assigned with a label and calculating a certainty factor of the predicted label (prediction label). The certainty factor of the prediction label indicates certainty of the predicted label. PTL 1 further describes terminating active learning when the certainty factor of the prediction label is greater than or equal to a predetermined threshold value.

CITATION LIST

Patent Literature

PTL 1: Japanese Unexamined Patent Application Publication No. 2011-203991

Non Patent Literature

NPL 1: Michael Bloodgood, K. Vijay-Shanker, "A Method for Stopping Active Learning Based on Stabilizing Predictions and the Need for User-Adjustable Stopping," Proceedings of the Thirteenth Conference on Computational Natural Language Learning, USA, Association for Computational Linguistics, June 2009, pp. 39 to 47

SUMMARY OF INVENTION

Technical Problem

However, there is an issue with the aforementioned technologies that new learning and evaluation for determining termination of active learning are generated, which requires a lot of processing time.

The present invention is made in view of the issue described above, and an objective thereof is to provide a technology of further improving man-hours and processing time for learning.

Solution to Problem

A learning apparatus according to one aspect of the present invention includes: update means for updating a dictionary used by a classifier; calculation means for calculating, by using a dictionary updated by the update means and one or more samples with labeling being samples assigned with labels, a ratio to a number of the samples with labeling as a loss with respect to all the samples with labeling; and determination means for determining whether or not to update the dictionary, by using the loss, wherein, when the determination means determines to update the dictionary, the update means updates the dictionary by using the samples with labeling added with a new sample with labeling, and wherein the determination means determines whether or not to update the dictionary, by using a loss calculated by using the updated dictionary and a loss calculated by using the dictionary before updating with respect to all the samples with labeling before adding the new sample with labeling.

A learning method according to one aspect of the present invention includes: updating a dictionary used by a classifier; by using the updated dictionary and one or more samples with labeling being samples assigned with labels, calculating a ratio to a number of the samples with labeling as a loss with respect to all the samples with labeling; determining whether or not to update the dictionary, by using the loss; when determining to update the dictionary, updating the dictionary by using samples with labeling added with a new piece of the samples with labeling; by using the updated dictionary and the samples with labeling added with the new sample with labeling, calculating a ratio to a number of the samples with labeling as a loss with respect to all the samples with labeling; and determining whether or not to update the dictionary, by using a loss calculated by using the updated dictionary and a loss calculated by using the dictionary before updating with respect to all the samples with labeling before adding the new sample with labeling.

Further, a classifier discriminating data by using a dictionary determined not to be updated by the aforementioned learning apparatus also falls under the category of the present invention.

Further, a computer program for realizing the aforementioned learning apparatus or learning method by a computer, and a computer-readable recording medium storing the computer program also fall under the category of the present invention.

Advantageous Effects of Invention

The present invention is able to further improve man-hours and processing time for learning.

EXAMPLE EMBODIMENT

First Example Embodiment

Figure 1:
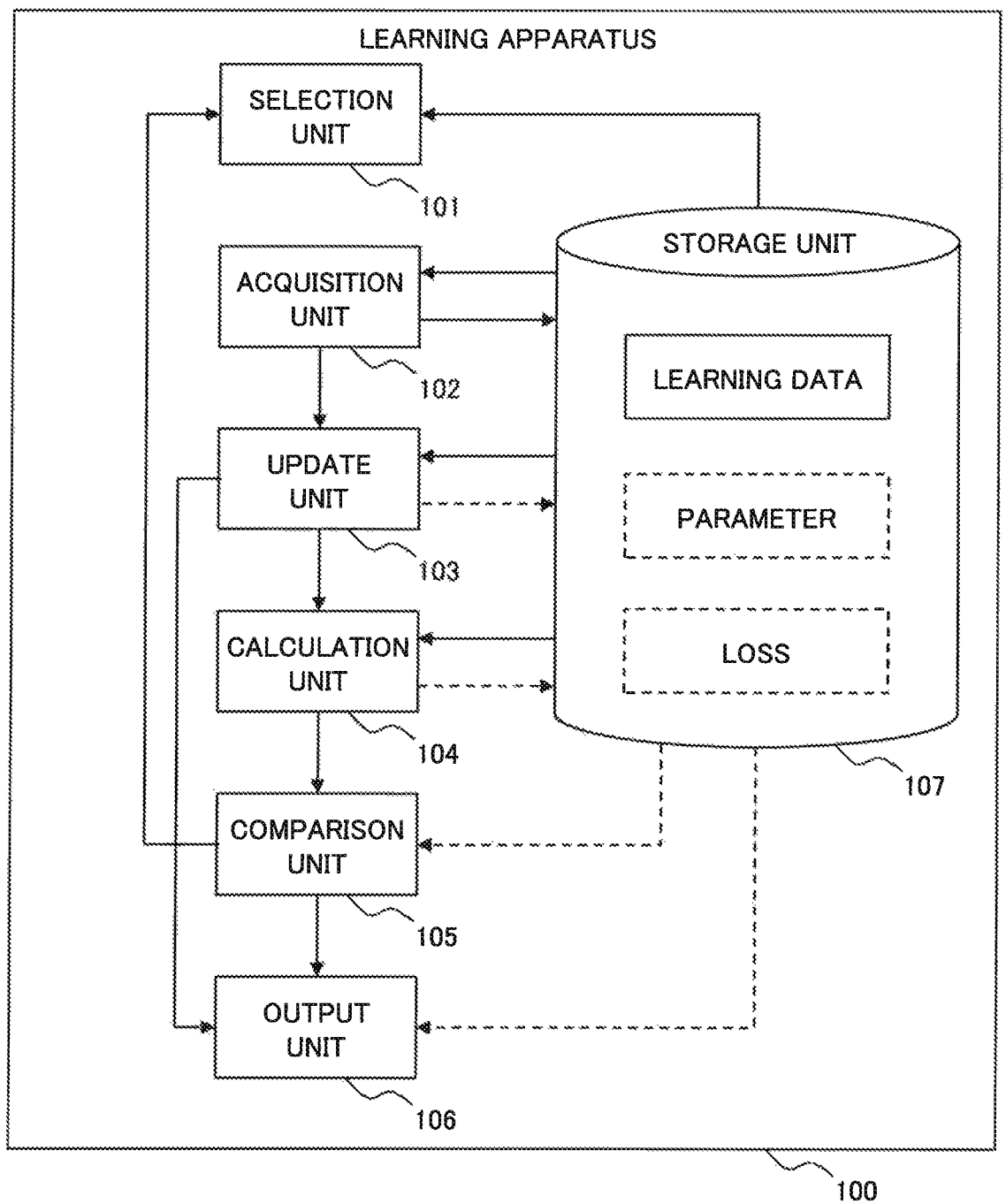
FIG. 1 is a functional block diagram illustrating an example of a functional configuration of a learning apparatus according to a first example embodiment of the present invention.

Referring to drawings, a first example embodiment of the present invention will be described in detail. FIG. 1 is a functional block diagram illustrating an example of a functional configuration of a learning apparatus 100 according to the present example embodiment. Note that a direction of an arrow in the drawing indicates an example and does not limit a signal direction between blocks. Similarly, a direction of an arrow in a drawing indicates an example in other block diagrams hereinafter referred to, and does not limit a signal direction between blocks. As illustrated in FIG. 1, the learning apparatus 100 according to the present example embodiment includes a selection unit 101, an acquisition unit 102, an update unit 103, a calculation unit 104, a comparison unit (determination unit) 105, an output unit 106, and a storage unit 107.

First, a number of samples being samples used for learning (learning data) and not being assigned with labels, according to the present example embodiment, is denoted as M (M is a natural number). Further, a number of samples assigned with labels is denoted as N (N is a natural number). The label indicates a class to which each sample belongs. In other words, a sample assigned with a label may be considered as a sample assigned with a label (sample with labeling) of a correct class (referred to as a correct-answer class). In subsequent description, a sample assigned with a label of a correct-answer class is referred to as a labeled sample, and a sample not assigned with a label is referred to as an unlabeled sample. Further, a label of a correct-answer class is also referred to as a correct-answer label.

Further, while the present example embodiment is described assuming that learning data (samples) supplied to the learning apparatus 100 are stored in the storage unit 107, the learning data may be directly supplied to each component to be described later.

The selection unit 101 selects a sample being a target of labeling, from learning data (samples) being supplied to the learning apparatus 100 and being stored in the storage unit 107, in accordance with an instruction from the comparison unit 105 to be described later. In other words, the selection unit 101 selects a sample being a target of labeling from samples used for learning and not being assigned with labels. When a set of the learning data is denoted as a sample set C, a set of unlabeled samples is denoted as a sample set B, and a set of labeled samples is denoted as a sample set A, the sample set C is a union of the sample set A and the sample set B. Then, when a sample belonging to the sample set B is assigned with a label, the sample assigned with the label belongs to the sample set A. Accordingly, a number of samples belonging to the sample set B decreases by one. A sample selection method performed by the selection unit 101 will be described later.

The storage unit 107 stores learning data supplied to the learning apparatus 100. The storage unit 107 stores each sample in a state of being associated with information indicating whether each sample belongs to the sample set A or the sample set B. Further, the storage unit 107 stores each of one or more samples associated with information indicating that the sample belongs to the sample set A, in a state of indicating a type of label assigned to the sample.

In other words, the storage unit 107 stores a sample associated with information related to a set. Then, a sample with information about a set indicating the sample set A, out of samples stored in the storage unit 107, is associated with a label.

Further, the storage unit 107 may store a dictionary (parameter) to be described later, a loss with respect to a labeled sample, and the like.

The storage unit 107 may be included in the learning apparatus 100, or may be provided by a storage device separate from the learning apparatus 100.

Further, while learning data, a parameter, and a loss are stored in a same storage unit in FIG. 1, the items may be stored in different storage units, respectively.

The acquisition unit 102 acquires information about a sample assigned with a label. Specifically, when a user assigns a label to a sample selected by the selection unit 101, the acquisition unit 102 acquires information about the sample assigned with the label. For example, when a user assigns a label to an unlabeled sample by using an unillustrated input device, the acquisition unit 102 may acquire information about the sample assigned with the label (labeled sample) in accordance with operation information of the input device. The acquisition unit 102 acquires information about each sample in a state of indicating a type of label assigned to the sample.

A sample assigned with a label belongs to the sample set B before the label is assigned. Accordingly, the acquisition unit 102 deletes a sample assigned with a label from the sample set B and includes the sample in the sample set A. Specifically, the acquisition unit 102 updates information about a set associated with a sample stored in the storage unit 107 from information about the sample set B to information about the sample set A. Then, the acquisition unit 102 associates a label with the sample stored in the storage unit 107.

Then, the acquisition unit 102 outputs information indicating acquisition of information about the sample assigned with the label to the update unit 103. The acquisition unit 102 may output information indicating an update of information associated with a sample stored in the storage unit 107 to the update unit 103. Further, the acquisition unit 102 may output a number N of labeled samples to the update unit 103 as information indicating acquisition of information about a sample assigned with a label. Further, the acquisition unit 102 may be configured to acquire from the storage unit 107 a sample newly assigned with a label or all samples assigned with labels (labeled samples belonging to the sample set A), and supply the update unit 103 with the sample or samples.

The update unit 103 receives from the acquisition unit 102 information indicating acquisition of information about a sample assigned with a label, a sample newly assigned with a label, or all samples assigned with labels. When receiving information indicating acquisition of information about a sample assigned with a label, or a sample newly assigned with a label, the update unit 103 acquires labeled samples from the storage unit 107. Then, the update unit 103 updates a dictionary stored in the update unit 103 and/or the storage unit 107 by using the labeled samples belonging to the sample set A. The dictionary is a parameter used for discriminating predetermined data such as voice and an image in a classifier. Further, while not particularly limited, the parameter indicates, for example, a feature of a typical pattern discriminated as specific by the classifier. The classifier discriminates unknown data in accordance with the parameter. An updating method of the dictionary will be described later.

The update unit 103 outputs an updated dictionary (a parameter of the classifier) to the calculation unit 104 and the output unit 106.

The calculation unit 104 receives a parameter from the update unit 103. Further, the calculation unit 104 acquires a labeled sample from the storage unit 107. Then, by using the parameter and the labeled sample stored in the storage unit 107, the calculation unit 104 calculates a loss with respect to the labeled sample.

It is assumed that a label $\{t_n | n=1, \ldots, N\}$ is assigned to each of N labeled samples $\{x_n | n=1, \ldots, N\}$. Note that $x_n$ denotes n-th sample (n=1, ..., N) assigned with a label (labeled sample). Further, the label $t_n$ denotes a label assigned to the labeled sample $x_n$ and indicates a correct-answer class.

At this time, a loss $L_N(\theta)$ with respect to all the labeled samples is defined by equation (1) below.

[Math. 1]

$$L_N(\theta) = \frac{1}{N} \sum_{n=1}^{N} \text{loss}(x_n; \theta) \tag{1}$$

Thus, the loss with respect to all the labeled samples is expressed by an equation having a number of labeled samples (N) as the denominator. In other words, the loss with respect to all the labeled samples is obtained by calculating a ratio of a sum of loss(x;θ) to the number of labeled samples.

In equation (1), θ denotes a dictionary (a parameter of the classifier). Further, loss(x;θ) denotes a loss (degree of an error) with respect to a vector x when the parameter θ is used. Here, loss(x;θ) is defined by equation (2) below.

[Math. 2]

$$\text{loss}(x_n; \theta) = \sum_{k=1}^{K} \max_{j \neq k} f(r_{kj}(x_n; \theta)) 1(t_n = \omega_k) \tag{2}$$

Note that K denotes a number of classes, and 1(·) denotes an indicator function returning a predetermined value in accordance with a true-false value. The indicator function according to the present example embodiment returns 1 when a conditional expression in the parenthesis is true and returns 0 when the conditional expression is false. Further, $\omega_k$ denotes a k-th (k=1, ..., K) class (correct-answer class). Further, j is a natural number greater than or equal to 1 and less than or equal to K. Further, $r_{kj}(x_n;\theta)$ is a criterion indicating mistakableness. A negative value of $r_{kj}(x_n;\theta)$ indicates correct recognition and a positive value indicates false recognition. Thus, loss(x;θ) is a loss with respect to each labeled sample, being calculated by using a dictionary updated by the update unit 103. Note that $r_{kj}(x_n;\theta)$ is defined by equation (3) below.

[Math. 3]

$$r_{kj}(x_n; \theta) = \frac{-g_k(x_n; \theta) + g_j(x_n; \theta)}{g_k(x_n; \theta) + g_j(x_n; \theta)} \tag{3}$$

Here, $g_k(x_n;\theta)$ denotes a discriminant function of a class $\omega_k$. Note that a value of the discriminant function is positive. Further, $g_k(x_n;\theta)$ is defined to take a greater value with respect to a class being more likely to belong. Accordingly, a class $\omega_k$ maximizing $g_k(x_n;\theta)$ becomes a class determined by the classifier (discrimination result).

Further, in equation (2), f(·) denotes a positive monotonically increasing function determining an amount of a loss with respect to mistakableness, and is defined by, for example, equation (4) below.

[Math. 4]

$$f(x) = \begin{cases} \dfrac{\xi x + 2}{4}, & x \geq 0 \\ \dfrac{1}{1 + e^{-\xi x}}, & x < 0 \end{cases} \tag{4}$$

Here, ζ (ζ>0) is a parameter indicating a slope. To a falsely recognized sample, a large loss is given.

As described above, by using a parameter and labeled samples stored in the storage unit 107, the calculation unit 104 calculates a loss $L_N$ with respect to the labeled samples. The calculation unit 104 may acquire a number N of labeled samples used for calculating the loss $L_N$ by counting a number of labeled samples stored in the storage unit 107, or may acquire the number from the acquisition unit 102 through the update unit 103.

Then, the calculation unit 104 outputs to the comparison unit 105 the loss $L_N$ with respect to labeled samples associated with the number of the labeled samples (N in this case) when the loss is calculated. Further, the calculation unit 104 may associate the calculated loss $L_N$ with the number of the labeled samples when the loss is calculated, and store the loss in the storage unit 107.

The comparison unit 105 receives from the calculation unit 104 the loss $L_N$ with respect to labeled samples associated with a number of labeled samples. The comparison unit 105 according to the present example embodiment designates the received loss $L_N$ as a loss $L_{new}$ and designates a loss calculated by the calculation unit 104 with respect to labeled samples, a number of which being less than the number of the labeled samples associated with the received loss $L_N$, as a loss $L_{old}$. The loss with respect to labeled samples, a number of which being less than the number of the labeled samples associated with the received loss $L_N$, may be stored in the comparison unit 105 or stored in the storage unit 107.

The comparison unit 105 determines whether or not to update a dictionary by comparing the loss $L_{new}$ with the loss $L_{old}$. When the loss $L_{old}$ is greater than the loss $L_{new}$, the comparison unit 105 determines not to update the dictionary and outputs to the output unit 106 an instruction to output the dictionary. Further, when the previously calculated loss $L_{old}$ is less than or equal to the received loss $L_{new}$, the comparison unit 105 determines to update the dictionary and outputs to the selection unit 101 an instruction to select a sample being a target of labeling.

The losses compared by the comparison unit 105 will be described. The comparison unit 105 according to the present example embodiment designates a loss $L_N$, when a number of labeled samples is N, as a loss $L_{new}$ and designates a loss $L_{N-1}$, when a number of labeled samples is N-1, as a loss $L_{old}$, and compares the loss $L_{new}$ with the loss $L_{old}$.

The output unit 106 receives from the comparison unit 105 an instruction to output a dictionary. Further, the output unit 106 receives from the update unit 103 a dictionary (parameter) updated by the update unit 103. Then, the output unit 106 outputs the dictionary received from the update unit 103 to, for example, the classifier, in accordance with the instruction from the comparison unit 105. The dictionary is a parameter used when a loss is calculated by the calculation unit 104. The output unit 106 may acquire from the storage unit 107 a dictionary to be output, and then output the dictionary.

Figure 2:
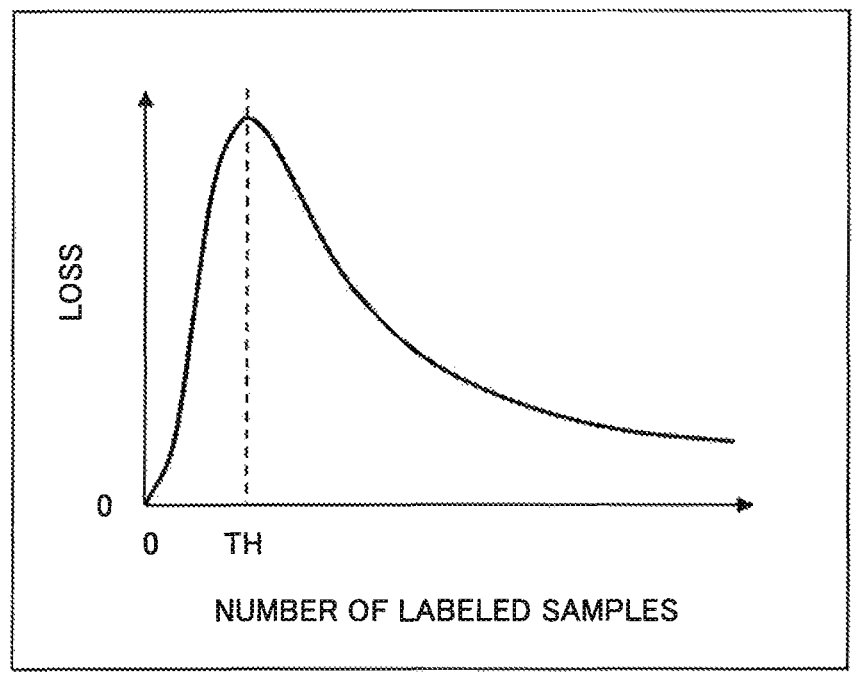
FIG. 2 is a diagram illustrating an example of change in a loss with respect to labeled samples versus increase in a number of labeled samples, in the learning apparatus according to the first example embodiment of the present invention.

Next, using FIG. 2, change in a loss with respect to labeled samples versus increase in a number of labeled samples will be described. FIG. 2 is a diagram illustrating an example of change in a loss with respect to labeled samples versus increase in a number of labeled samples, in the learning apparatus 100 according to the present example embodiment. In FIG. 2, the horizontal axis indicates a number of labeled samples, and the vertical axis indicates a loss with respect to labeled samples.

The reason that a loss decreases in inverse proportion to a number of labeled samples (N) will be described. First, aforementioned equation (1) will be rewritten as equation (5) below. Equation (5) is an equation obtained by simplifying equation (1), omitting an expression of θ from equation (1).

[Math. 5]

$$L_N = \frac{1}{N}\sum_{n=1}^{N} \text{loss}(x_n) = \frac{m}{L}L_m + \frac{1}{N}\sum_{n=m+1}^{N} \text{loss}(x_n) \quad (5)$$

Here, m is any natural number greater than or equal to 1 and less than or equal to N. Assuming that a value of loss $(x_n)$ being a loss with respect to $x_n$ is a sufficiently small value when n takes a value greater than m+1, the second term of the right side of equation (5) takes a sufficiently small value. Accordingly, the first term becomes dominant in the right side of equation (5). In this case, m and $L_m$ are fixed values, and therefore the loss $L_N$ decreases in inverse proportion to N.

In other words, in a case that a correct-answer label is preferentially assigned to a sample with a low-reliability discrimination result, when a loss starts to decrease in inverse proportion to a number of labeled samples (N), it may be considered that a sample causing a great loss no longer exists. Consequently, the loss $L_N$ may be considered as an indicator of determination to terminate labeling work of a correct-answer class.

As illustrated in FIG. 2, the learning apparatus 100 according to the present example embodiment preferentially assigns a label to a sample with a low-reliability discrimination result by active learning, and therefore a loss increases sharply in an initial stage (when a number of labeled samples is smaller). However, as illustrated in FIG. 2, the loss starts to decrease in inverse proportion to increase in the number of labeled samples from a point at which the number of labeled samples exceeds a certain value (TH in FIG. 2).

Figure 3:
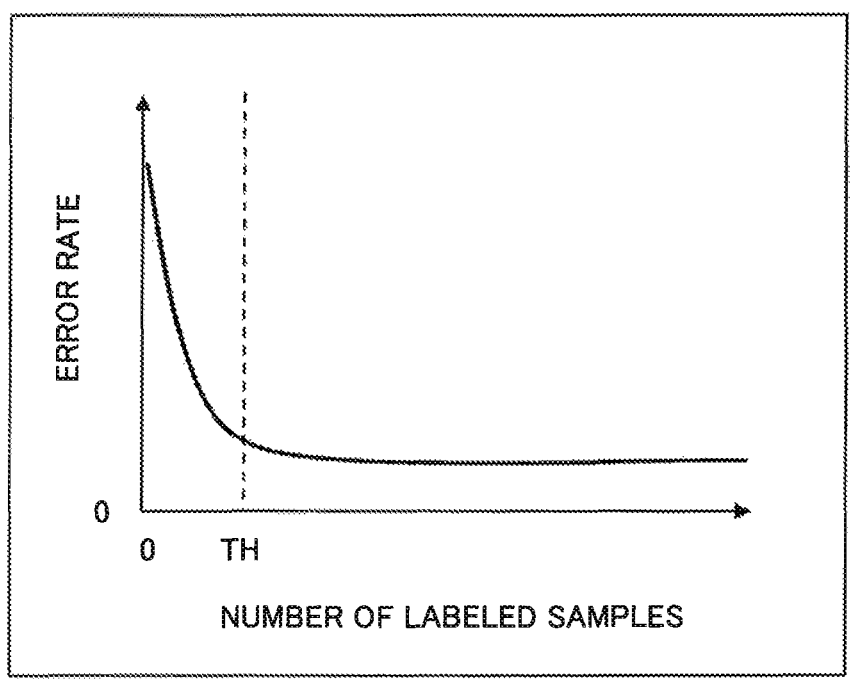
FIG. 3 is a diagram illustrating an example of an error rate when an evaluation set assigned with labels is recognized by using a recognition dictionary obtained each time a number of labeled samples is increased, in the learning apparatus according to the first example embodiment of the present invention.

Using FIG. 3, an error rate when evaluation samples assigned with labels (also referred to as an evaluation set) are recognized by using a recognition dictionary obtained each time a number of labeled samples increases will be described. FIG. 3 is a diagram illustrating an example of an error rate when an evaluation set assigned with labels is recognized by using a recognition dictionary obtained each time a number of labeled sample increases (referred to as a stage), in the learning apparatus 100 according to the present example embodiment. In FIG. 3, the horizontal axis indicates the number of labeled samples, and the vertical axis indicates the error rate. In FIG. 3, TH denotes a value similar to the number of labeled samples (TH) indicated by a broken line in FIG. 2, and indicates the number of labeled samples at a point when the loss starts to decrease in inverse proportion to the number of labeled samples in FIG. 2.

As illustrated in FIG. 3, the error rate decreases sharply in an initial stage (when the number of labeled samples is smaller). Then, the error rate becomes nearly constant as the number of labeled samples exceeds a certain value (TH).

As understood from the description above, the loss $L_N$ defined by equation (1) is more suitable as an indicator of determination to terminate labeling work of a correct-answer class. Accordingly, the comparison unit 105 may be considered to determine whether or not a number N of labeled samples, when the calculation unit 104 calculates a loss $L_N$, is a value TH indicated in FIG. 3. In other words, the comparison unit 105 may be considered to determine a point at which the loss $L_N$ starts to decrease in inverse proportion to the number of labeled samples.

Figure 4:
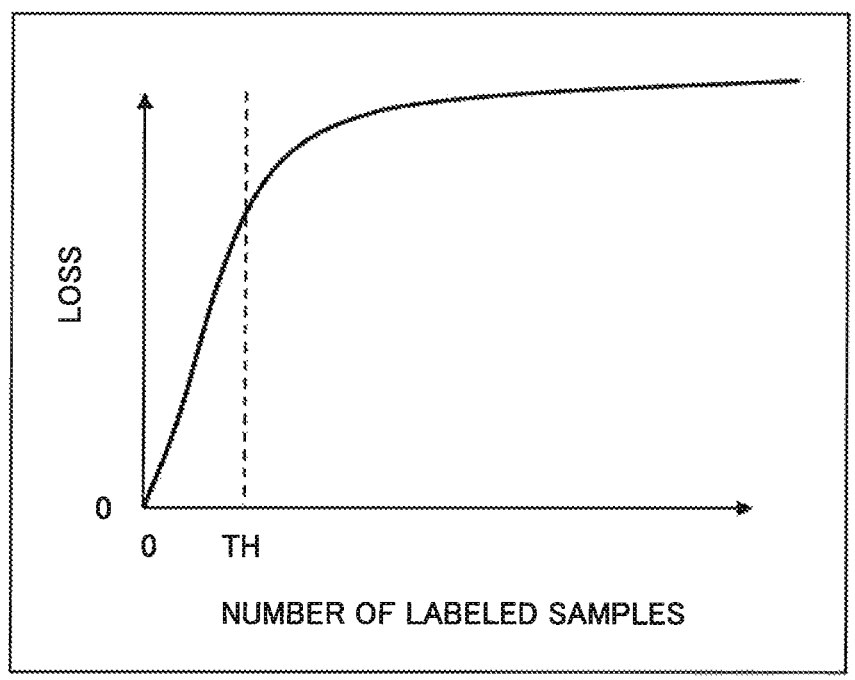
FIG. 4 is a diagram illustrating another example of change in a loss with respect to labeled samples versus increase in a number of labeled samples.

Further, in order to describe an effect of loss calculation using equation (1), an example of a loss calculated by using an equation obtained by omitting 1/N from the right side of equation (1) is illustrated in FIG. 4. FIG. 4 is a diagram illustrating another example of change in a loss with respect to labeled samples versus increase in a number of labeled samples. In FIG. 4, the horizontal axis indicates a number of labeled samples, and the vertical axis indicates a loss with respect to labeled samples. Note that TH in FIG. 4 denotes a value similar to the number of labeled samples (TH) indicated by a broken line in FIG. 2.

As illustrated in FIG. 4, a loss calculated by an equation obtained by omitting 1/N in the right side of equation (1) monotonically increases and does not decrease. Accordingly, when the learning apparatus 100 calculates a loss by using an equation not having a number of labeled samples as the denominator, determination to terminate labeling work of a correct-answer class becomes difficult. Accordingly, it is understood that it is preferable that an equation used when the calculation unit 104 in the learning apparatus 100 according to the present example embodiment calculates a loss be an equation having a number of labeled samples (N) as the denominator, as expressed by equation (1).

(Processing Flow in Learning Apparatus 100)

Figure 5:
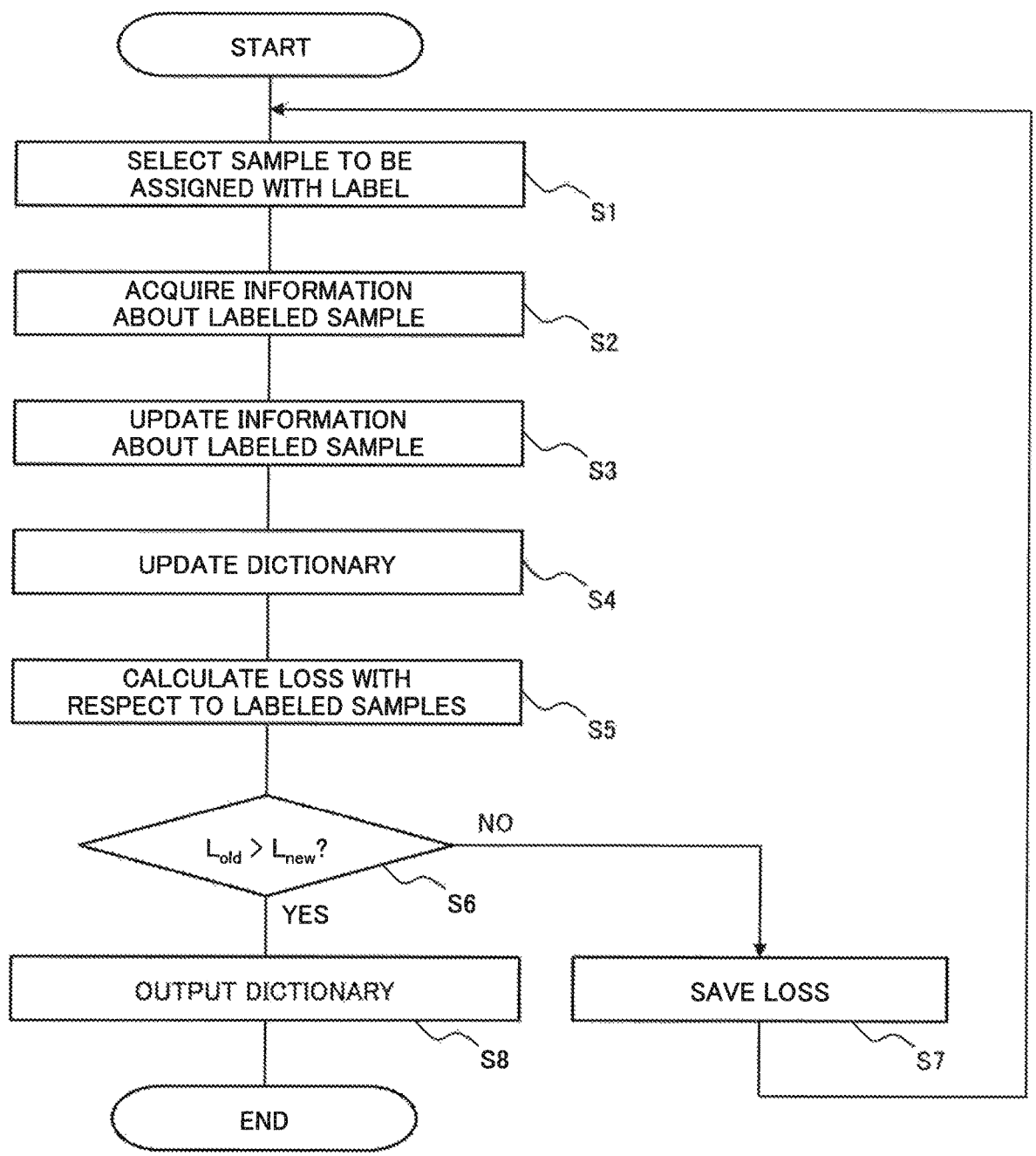
FIG. 5 is a flowchart illustrating an example of a processing flow in the learning apparatus according to the first example embodiment of the present invention.

Next, a processing flow in the learning apparatus 100 according to the present example embodiment will be described. FIG. 5 is a flowchart illustrating an example of a processing flow in the learning apparatus 100 according to the present example embodiment.

As a prerequisite, it is assumed that a discriminant function of a class $\omega_k$ is given by equation (6) below.

[Math. 6]

$$g_k(z; \theta) = \frac{1}{\|z - y_k\|^2} \quad (6)$$

Note that z denotes input data, and $y_k$ denotes a parameter of a classifier with respect to a class $\omega_k$. Accordingly, the parameter $\theta$ of the classifier becomes $\theta = \{y_k | k=1, \ldots, K\}$. K denotes a number of classes. Consequently, the classifier calculates equation (6) with respect to input data for each of $k=1, \ldots, K$ to obtain a value of k maximizing equation (6). Then, the classifier discriminates the input data as a k-th class $\omega_k$.

The discriminant function is not limited to the equation expressed by equation (6), and any discriminant function may be used. Even in this case, the learning apparatus 100 is able to suitably perform processing described below.

Further, as a prerequisite for performing processing described below, it is assumed that one sample assigned with a correct-answer class label is provided for each class to be an initial value of $y_k$ (k=1, ..., K). It is assumed that a parameter $\theta$ composed of the initial value is stored in the update unit 103. As described above, the parameter $\theta$ may be stored in the storage unit 107.

Further, the samples assigned with correct-answer class labels are stored in the storage unit 107 as labeled samples. The labeled samples belong to the aforementioned sample set A. At this time, a number N of the labeled samples becomes N=K.

Further, a loss $L_N$ calculated by the calculation unit 104 by using equation (1) is not calculated at this point. Accordingly, a value of a previously calculated loss $L_{old}$ is set to 0. It is further assumed that the loss $L_{old}$ is stored in the comparison unit 105. As described above, the loss $L_{old}$ may be stored in the storage unit 107.

It is further assumed that the storage unit 107 stores M samples not assigned with labels (unlabeled samples) $\{w_b | b=1, \ldots, M\}$ as learning data. As described above, the unlabeled samples belong to the sample set B.

As illustrated in FIG. 5, the selection unit 101 in the learning apparatus 100 according to the present example embodiment selects a sample being a target of labeling from the unlabeled samples stored in the storage unit 107.

Specifically, the selection unit 101 calculates $g_k(w_b; \theta)$ for each unlabeled sample belonging to the sample set B by using equation (6). Specifically, the selection unit 101 calculates $g_k(w_b; \theta)$ for each unlabeled sample $w_b$ by substituting $w_b$ for z in equation (6).

Then, the selection unit 101 obtains k maximizing equation (6) and k giving a next largest value for equation (6), for each unlabeled sample $w_b$. The value of k maximizing equation (6) is denoted as i (i is a natural number greater than or equal to 1 and less than or equal to K), and the value of k giving a next largest value for equation (6) is denoted as j (j is a natural number greater than or equal to 1 and less than or equal to K). Then, the selection unit 101 sets an i-th class $\omega_i$ to a class taking the first level (first-level class) and a j-th class $\omega_j$ to a class taking the second level (second-level class).

Then, the selection unit 101 calculates $r_{ij}$ for each unlabeled sample $w_b$ by using equation (7) below. Equation (7) is obtained by substituting $w_b$ for $x_n$ in aforementioned equation (3).

[Math. 7]

$$r_{ij}(w_b; \theta) = \frac{-g_i(w_b; \theta) + g_j(w_b; \theta)}{g_i(w_b; \theta) + g_j(w_b; \theta)} \quad (7)$$

A value of $r_{ij}$ calculated by equation (7) is always negative. An unlabeled sample $w_b$, being used for calculation of $r_{ij}$, with a greater value of $r_{ij}$, that is, with a value of $r_{ij}$ closer to 0, is a sample with a smaller difference between the first-level class and the second-level class. In other words, such an unlabeled sample is a sample near a discrimination boundary, meaning that the sample is likely to be discriminated as a sample with a class not being a correct-answer class.

Accordingly, the selection unit 101 selects an unlabeled sample $w_b$ having a largest value of $r_{ij}$ from unlabeled samples belonging to the sample set B, as a sample being a target of labeling (referred to as a target sample) (Step S1).

By the processing, the selection unit 101 is able to preferentially select an unlabeled sample likely to be discriminated as a class not being a correct-answer class.

Next, when a user labels the target sample selected in Step S1 with a correct-answer class, the acquisition unit 102 acquires information about the labeled sample (referred to as a labeled sample $x_n$) (Step S2). Then, the acquisition unit 102 updates information being associated with the labeled sample and being stored in the storage unit 107. Specifically, the acquisition unit 102 changes a set to which the labeled sample $x_n$ belongs from the sample set B to the sample set A, associates a label assigned to the labeled sample $x_n$ with the labeled sample $x_n$, and stores the information in the storage unit 107 (Step S3).

Consequently, a number M of unlabeled samples belonging to the sample set B decreases by one, and a number N of labeled samples belonging to the sample set A increases by one.

Next, the update unit 103 updates a dictionary (a parameter $\theta$ of the classifier) by using the sample set A. Specifically, the update unit 103 updates the parameter $\theta$ to reduce a value of equation (1), by using a steepest descent method expressed by expression (8) below (Step S4).

[Math. 8]

$$\theta \leftarrow \theta - \varepsilon \frac{\partial L_N(\theta)}{\partial \theta} \quad (8)$$

In expression (8), $\varepsilon$ is a real number greater than 0.

Next, the calculation unit 104 calculates a loss $L_N$ with respect to labeled samples from equation (1) by using the parameter θ updated by the update unit 103 and the labeled sample $x_n$ stored in the storage unit 107 (Step S5).

Then, the comparison unit 105 designates the loss $L_N$ calculated by the calculation unit 104 as $L_{new}$, and compares $L_{new}$ with $L_{old}$ (Step S6). Consequently, the comparison unit 105 is able to determine a time at which the loss $L_N$ starts to decrease in inverse proportion to a number of labeled samples.

Then, in a case of $L_{old} \leq L_{new}$, (NO in Step S6), the comparison unit 105 saves the loss $L_{new}$. Specifically, the comparison unit 105 substitutes $L_{new}$ for $L_{old}$ (Step S7). Then, the comparison unit 105 returns the processing to Step S1. Subsequently, the selection unit 101 newly selects a sample being a target of labeling from the unlabeled samples stored in the storage unit 107 (Step S1).

In a case of $L_{old} > L_{new}$, (YES in Step S6), the output unit 106 outputs the current parameter θ as the dictionary (Step S8).

The above concludes the learning processing by the learning apparatus 100.

(Effect)

The learning apparatus 100 according to the present example embodiment is able to further improve man-hours and processing time for learning.

The reason is that, by using a dictionary updated by the update unit 103 and one or more labeled samples, the calculation unit 104 calculates a ratio to a number of the labeled samples as a loss with respect to all the labeled samples. Then, by using the loss, the comparison unit 105 determines whether or not to update the dictionary.

A loss obtained by an equation having a number of labeled samples as the denominator has a property that the loss decreases in inverse proportion to the number of labeled samples at a time when a sample causing a greater loss no longer exists.

In general, when labeling with a correct-answer class by active learning, stability of a classifier is often evaluated as determination of termination. Consequently, a common learning apparatus newly performs learning and evaluation, and separately provides a required evaluation set. Accordingly, a common learning apparatus often requires a lot of man-hours and processing time for learning.

However, the comparison unit 105 determines termination of dictionary updating by using a loss calculated by the calculation unit 104 in the learning apparatus 100 according to the present example embodiment. Accordingly, the learning apparatus 100 according to the present example embodiment does not need to newly perform learning and evaluation for determining termination of labeling work of a correct-answer class in active learning. Further, the learning apparatus 100 according to the present example embodiment does not need to separately provide an evaluation set required for such learning and evaluation, either. Accordingly, the learning apparatus 100 according to the present example embodiment is able to determine termination of labeling work of a correct-answer class in active learning with high precision.

Thus, the learning apparatus 100 according to the present example embodiment is able to determine termination of labeling work of a correct-answer class with high precision, and therefore is able to further improve man-hours and processing time for learning.

(Modified Example)

A modified example of a loss compared by the comparison unit 105 in the learning apparatus 100 according to the present example embodiment will be described. Upon receiving a loss $L_N$ from the calculation unit 104, the comparison unit 105 may calculate an average of one or more losses ($L_N$, $L_{N-1}$, . . . , $L_{N-h}$ where h is any natural number less than N) including the loss $L_N$ and designate the average as $L_{new}$. Further, the comparison unit 105 may calculate an average of losses ($L_{N-h-1}$, $L_{N-h-2}$, . . . , $L_{N-h-p}$ where p is any natural number less than N-h) not used in the calculation of aforementioned $L_{new}$, out of previously calculated losses, and designate the average as $L_{old}$. Then, the comparison unit 105 may compare $L_{old}$ with $L_{new}$, respectively described above.

Consequently, a number N of labeled samples satisfying $L_{old} > L_{new}$ may increase, compared with the first example embodiment. Accordingly, the learning apparatus 100 according to the present modified example is able to output a dictionary with higher discrimination precision than a dictionary output by the learning apparatus 100 according to the first example embodiment.

Second Example Embodiment

Next, a second example embodiment of the present invention will be described. The comparison unit 105 in the learning apparatus 100 according to the first example embodiment compares a loss with respect to N labeled samples with a previously calculated loss with respect to (N-1) labeled samples. However, a loss to be compared by the comparison unit 105 is not limited to the above. Another example of an operation of the comparison unit 105 will be described, according to the present example embodiment. For convenience of description, a same reference sign is given to a component having a same function as that of a component in a drawing described in the first example embodiment, and description thereof is omitted.

Figure 6:
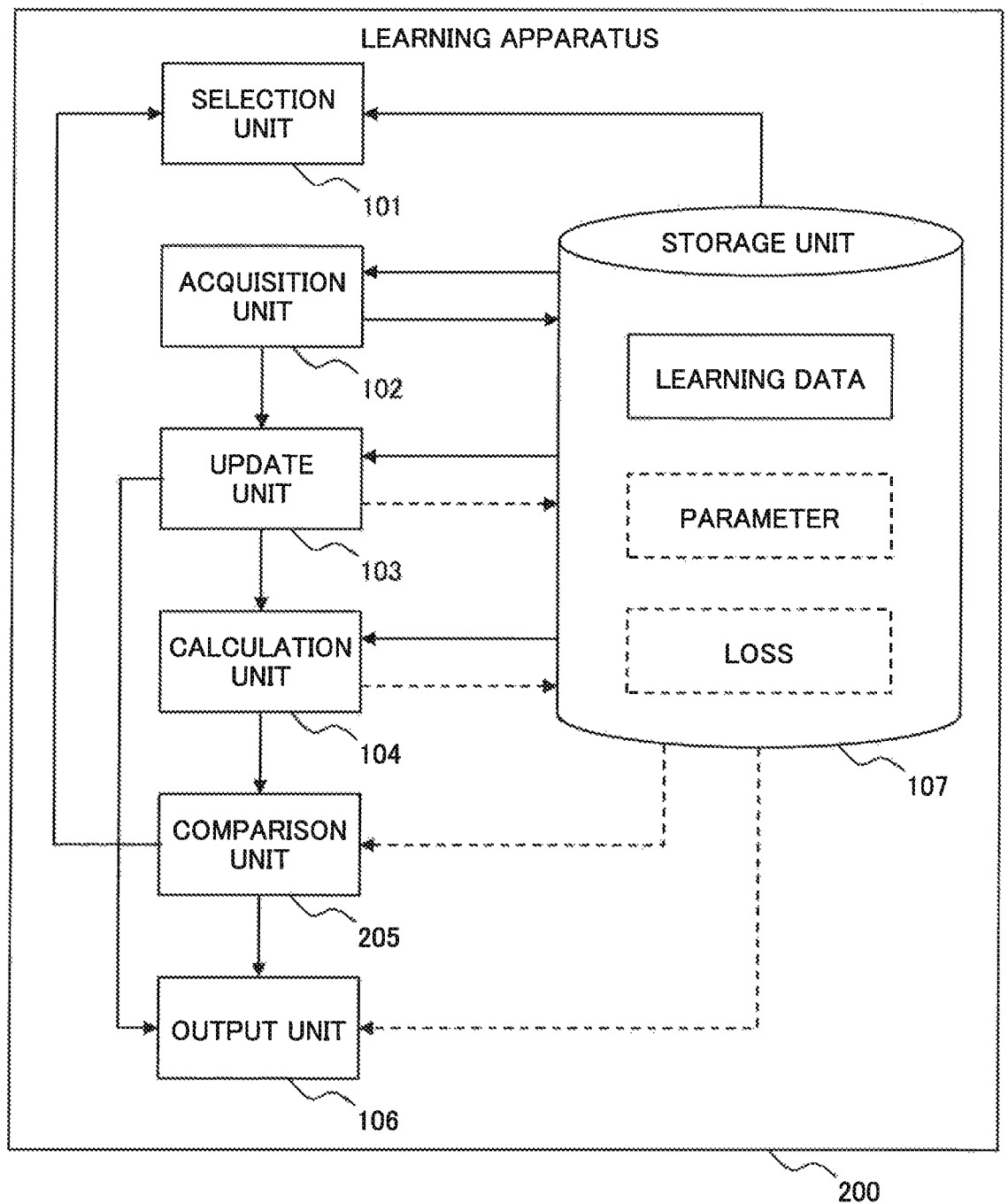
FIG. 6 is a functional block diagram illustrating an example of a functional configuration of a learning apparatus according to a second example embodiment of the present invention.

FIG. 6 is a functional block diagram illustrating an example of a functional configuration of a learning apparatus 200 according to the present example embodiment. As illustrated in FIG. 6, the learning apparatus 200 according to the present example embodiment includes a selection unit 101, an acquisition unit 102, an update unit 103, a calculation unit 104, a comparison unit (determination unit) 205, an output unit 106, and a storage unit 107.

The comparison unit 205 receives from the calculation unit 104 a loss $L_N$ with respect to labeled samples. Then, by using the received loss $L_N$, and losses $L_{N-1}$, . . . , $L_{N-c}$ (c is any natural number less than N) being previously calculated by the calculation unit 104 and being stored in the comparison unit 205 and/or the storage unit 107, the comparison unit 205 calculates $X_q$ and $Y_q$ by equation (9) below.

[Math. 9]

$$\begin{cases} Y_q = \dfrac{L_{N-q}}{L_N} \\ X_q = \dfrac{N}{N-q} \end{cases} \quad (9)$$

Note that q is a natural number greater than or equal to 1 and less than or equal to c.

Then, by using calculated $X_q$ and $Y_q$, the comparison unit 205 calculates a correlation coefficient between $X_q$ and $Y_q$ by using equation (10) below.

[Math. 10]

$$R = \dfrac{\sum\limits_{q=1}^{c}(X_q - \mu_X)(Y_q - \mu_Y)}{\sqrt{\sum\limits_{q=1}^{c}(X_q - \mu_X)^2}\sqrt{\sum\limits_{q=1}^{c}(Y_q - \mu_Y)^2}} \quad (10)$$

Note that $\mu_x$ denotes an average of $X_q$ (q=1, ..., c) and $\mu_Y$ denotes an average of $Y_q$ (q=1, ..., c).

When the loss $L_N$ is attenuated by 1/N, the value of R becomes R=1. When the loss $L_N$ is attenuated by a factor of N, $\{L_N, L_{N-1}, \ldots, L_{N-c}\}$ respectively become $\{\alpha/N, \alpha/(N-1), \ldots, \alpha/(N-c)\}$. Note that $\alpha$ is any positive real number. Accordingly, $\{L_{N-1}/L_N, \ldots, L_{N-c}/L_N\}$ respectively become $\{N/(N-1), \ldots, N/(N-c)\}$.

Accordingly, when a correlation between $X_q$ and $Y_q$ is high, R takes a value close to 1, and therefore the loss with respect to labeled samples may be determined to be attenuated by a value close to 1/N. From the description above, it is understood that the correlation coefficient R is more suitable as an indicator of determination to terminate labeling work of a correct-answer class.

Then, the comparison unit 205 compares R with a predetermined threshold value and, when R is greater than the predetermined threshold value, outputs to the output unit 106 an instruction to output a dictionary. Further, when R is less than or equal to the predetermined threshold value, the comparison unit 205 outputs to the selection unit 101 an instruction to select a sample being a target of labeling. The predetermined threshold value may be preset by a user or set by learning. A value more suitable for discriminating a point at which a loss $L_N$ starts to decrease in inverse proportion to a number of labeled sample may be set as the predetermined threshold value. Thus, the comparison unit 205 may be considered to discriminate a point at which the loss $L_N$ starts to decrease in inverse proportion to the number of labeled samples, by using the correlation coefficient R.

(Processing Flow in Learning Apparatus 200)

Figure 7:
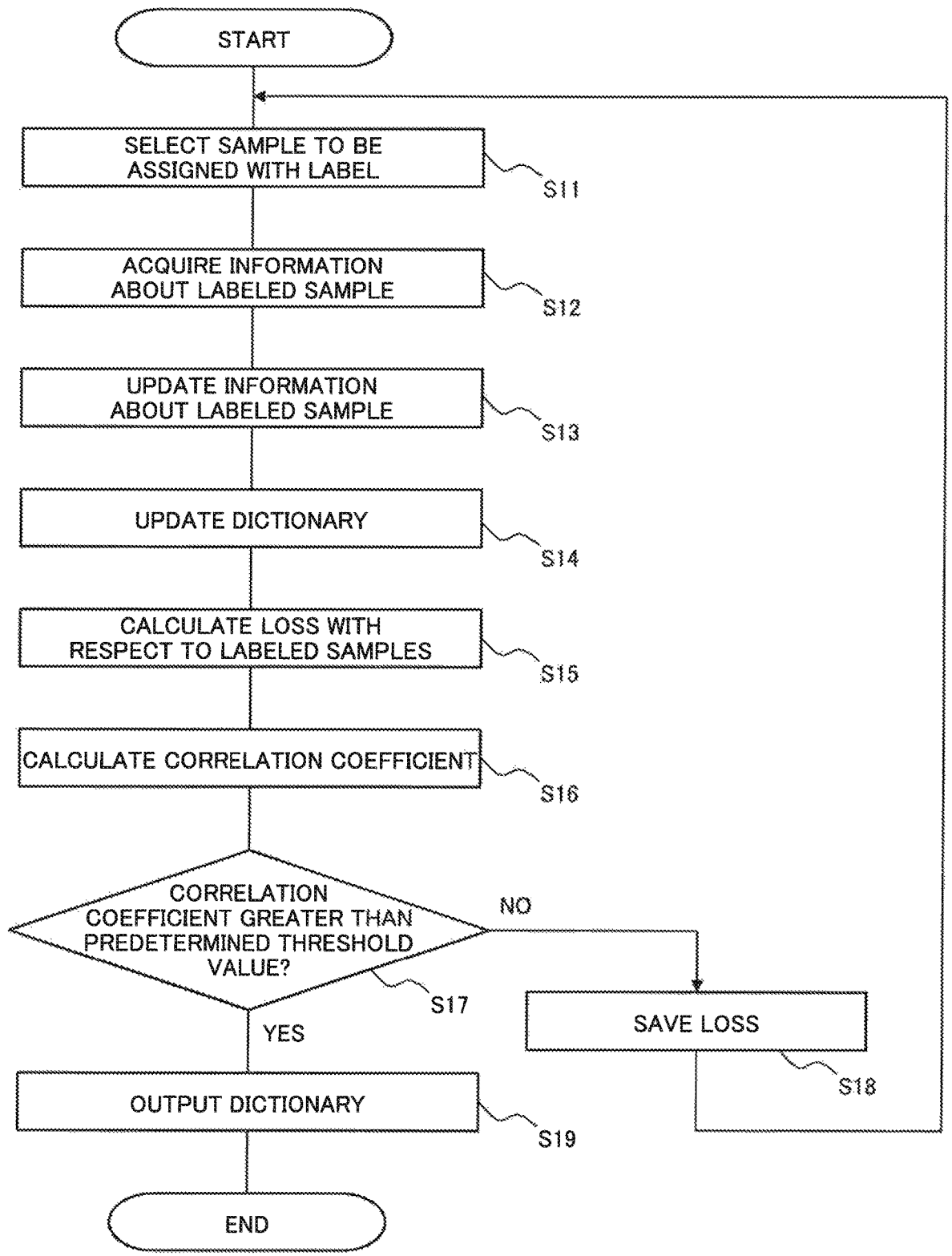
FIG. 7 is a flowchart illustrating an example of a processing flow in the learning apparatus according to the second example embodiment of the present invention.

Next, a processing flow in the learning apparatus 200 according to the present example embodiment will be described. FIG. 7 is a flowchart illustrating an example of a processing flow in the learning apparatus 200 according to the present example embodiment.

As a prerequisite, it is assumed that a discriminant function of a class $\omega_k$ is aforementioned equation (6). It is further assumed as a prerequisite for performing processing described below that a parameter $\theta$ to be set is similar to that according to the first example embodiment. It is further assumed that the storage unit 107 stores N labeled samples and M unlabeled samples, similarly to the first example embodiment.

Steps S11 to S15 illustrated in FIG. 7 are similar to aforementioned Steps S1 to Step S5, and therefore description thereof is omitted.

After completion of Step S15, the comparison unit 205 receives a loss $L_N$ calculated by the calculation unit 104 and calculates a correlation coefficient R between $X_q$ and $Y_q$ by using equations (9) and (10) (Step S16). Then, the comparison unit 205 compares the calculated correlation coefficient R with a predetermined threshold value (Step S17). Consequently, the comparison unit 205 is able to discriminate a point at which the loss $L_N$ starts to decrease in inverse proportion to a number of labeled samples.

Then, in a case that the correlation coefficient R is greater than or equal to the predetermined threshold value (NO in Step S17), the comparison unit 205 saves the loss $L_N$ calculated in Step S15. Specifically, the comparison unit 205 stores the loss $L_N$ in the comparison unit 205 and/or the storage unit 107 so that the loss $L_N$ can be used for next calculation of the correlation coefficient R (Step S18). Then, the comparison unit 205 returns the processing to Step S1. Subsequently, the selection unit 101 newly selects a sample being a target of labeling from the unlabeled samples stored in the storage unit 107 (Step S11).

In a case that the correlation coefficient R is greater than the predetermined threshold value (YES in Step S17), the output unit 106 outputs the current parameter $\theta$ as a dictionary (Step S19).

The above concludes the learning processing by the learning apparatus 200.

Thus, similarly to the learning apparatus 100 according to the first example embodiment, the learning apparatus 200 according to the present example embodiment is able to discriminate a point at which a loss $L_N$ starts to decrease in inverse proportion to a number of labeled samples. Accordingly, the learning apparatus 200 according to the present example embodiment is able to provide an effect similar to that of the learning apparatus 100 according to the first example embodiment.

Third Example Embodiment

Figure 8:
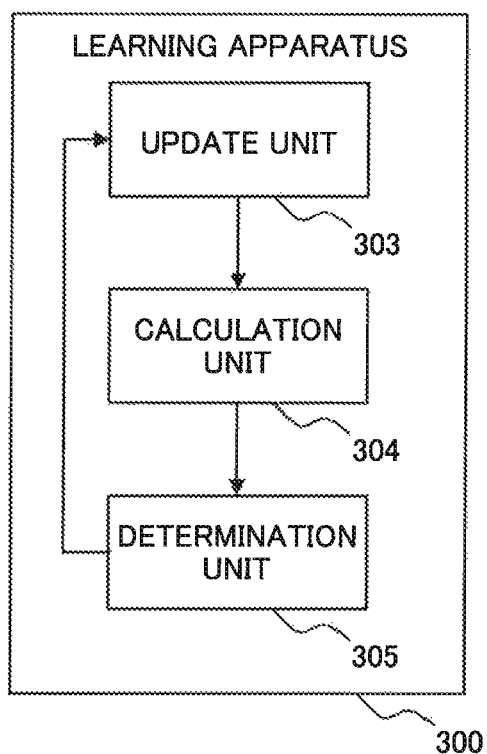
FIG. 8 is a functional block diagram illustrating an example of a functional configuration of a learning apparatus according to a third example embodiment of the present invention.

Referring to drawings, a third example embodiment of the present invention will be described. A minimum configuration for solving the problem by the present invention, according to the present example embodiment, will be described. FIG. 8 is a functional block diagram illustrating an example of a functional configuration of a learning apparatus 300 according to the present example embodiment.

As illustrated in FIG. 8, the learning apparatus 300 according to the present example embodiment includes an update unit 303, a calculation unit 304, and a determination unit 305. The learning apparatus 300 may be configured to include a storage unit 107, similarly to the first example embodiment.

The update unit 303 corresponds to the aforementioned update unit 103. The update unit 303 updates a dictionary used by a classifier, in accordance with a determination result of the determination unit 305. Specifically, when the determination unit 305 determines to update the dictionary, by using labeled samples added with a new labeled sample (sample with labeling), the update unit 303 changes a parameter until a loss value converges, and updates the dictionary used by the classifier to a parameter (dictionary) at a point when the loss value converges.

The calculation unit 304 corresponds to the aforementioned calculation unit 104. By using a dictionary updated by the update unit 303 and one or more labeled samples being samples assigned with labels, the calculation unit 304 calculates a loss with respect to all the labeled samples. The calculation unit 304 calculates a ratio to a number of the labeled samples as the loss with respect to all the labeled samples.

The determination unit 305 corresponds to the aforementioned comparison unit 105 or comparison unit 205. The determination unit 305 determines whether or not to update a dictionary, by using a loss calculated by the calculation unit 304. Then, when the dictionary is determined to be updated, the determination unit 305 transmits the determination result to the update unit 303. Subsequently, at every update of the dictionary, the determination unit 305 determines whether or not to update the dictionary, by using a loss with respect to all the labeled samples added with a new labeled sample, being calculated by using the updated dictionary, and a loss with respect to all the labeled samples before the new labeled sample is added, being calculated by using the dictionary before the update, and transmits the determination result to the update unit 303.

As described above, similarly to the learning apparatus 100 according to the first example embodiment, the learning apparatus 300 according to the present example embodiment is able to further improve man-hours and processing time for learning.

<System Configuration>

Figure 9:
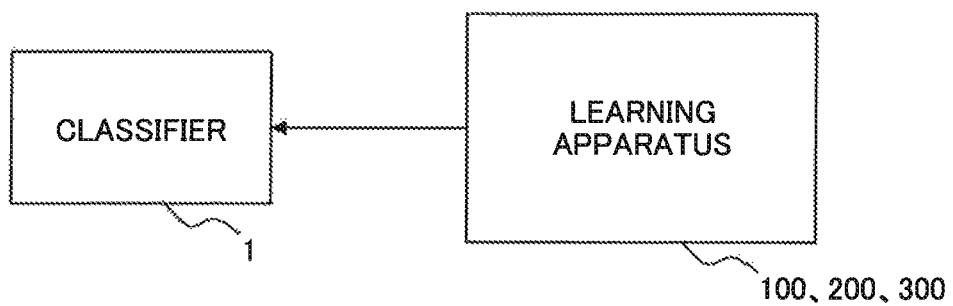
FIG. 9 is a diagram illustrating an example of a system configuration including the learning apparatus according to the respective example embodiments of the present invention.

Next, referring to FIG. 9, a system configuration including the learning apparatus (100, 200, 300) according to the respective aforementioned example embodiments will be described. FIG. 9 is a diagram illustrating an example of a system configuration including the learning apparatus (100, 200, 300) according to the respective example embodiments.

As illustrated in FIG. 9, the system includes a classifier (discrimination apparatus) 1 and the learning apparatus (100, 200, 300). The classifier 1 performs discrimination by using a dictionary output from the output unit 106 in the learning apparatus (100, 200) or a dictionary determined not to be updated in the learning apparatus 300.

Thus, the classifier is able to perform discrimination by using the dictionary obtained from the learning apparatus (100, 200, 300) according to the respective example embodiments.

<Hardware Configuration Example>

A configuration example of hardware capable of realizing the learning apparatus (100, 200, 300) according to the respective aforementioned example embodiments will be described. The aforementioned learning apparatus (100, 200, 300) may be realized as a dedicated apparatus but may also be realized by using a computer (information processing apparatus).

Figure 10:
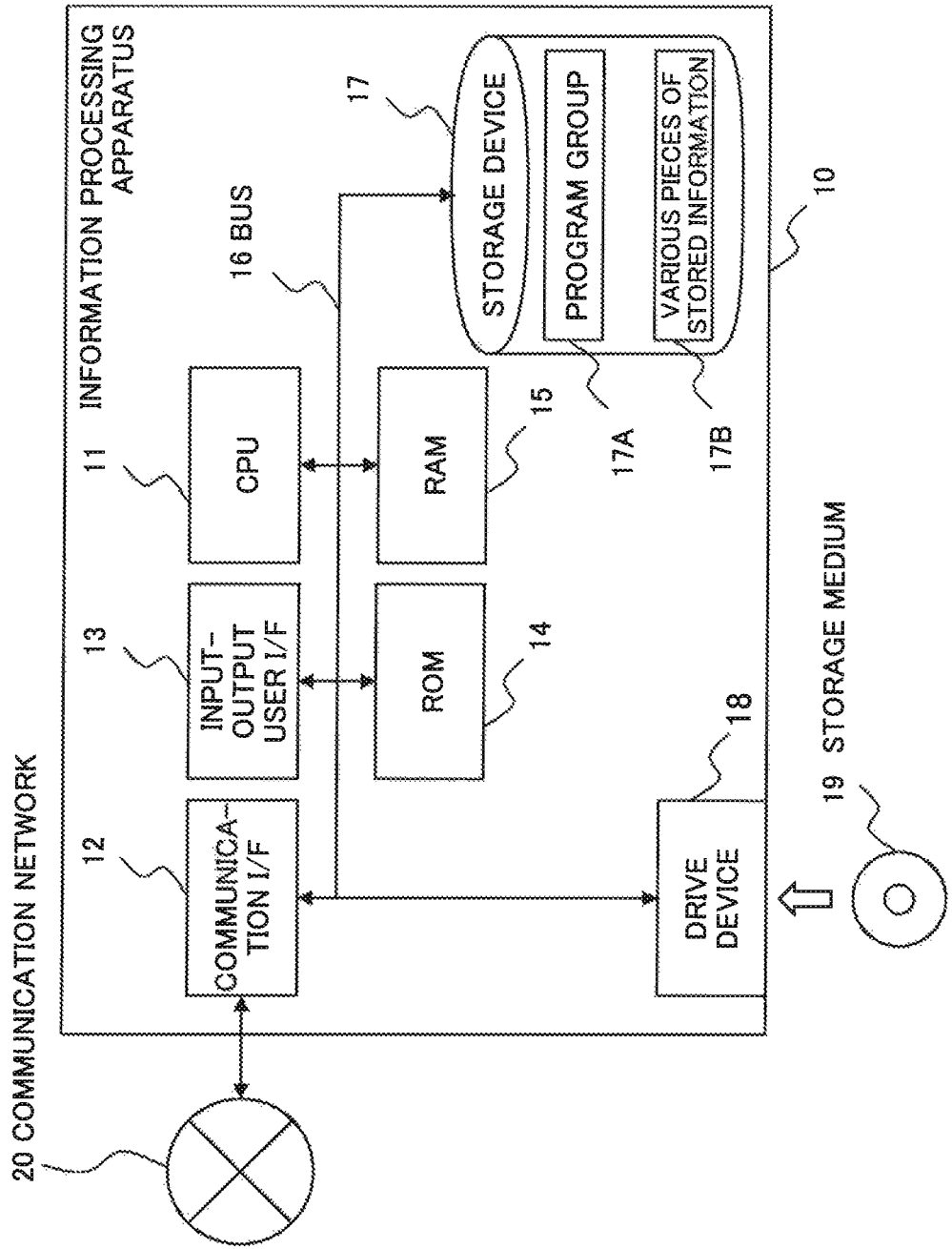
FIG. 10 is a diagram exemplifying a hardware configuration of a computer (information processing apparatus) capable of implementing the respective example embodiments of the present invention.

FIG. 10 is a diagram exemplifying a hardware configuration of a computer (information processing apparatus) capable of realizing the respective example embodiments of the present invention.

Hardware of an information processing apparatus (computer) 10 illustrated in FIG. 10 includes the following components:

A central processing unit (CPU) 11,
A communication interface (I/F) 12, an input-output user interface 13,
A read only memory (ROM) 14,
A random access memory (RAM) 15,
A storage device 17, and
A drive device 18 for a computer-readable storage medium 19.

Further, the components are mutually connected by a bus 16. The input-output user interface 13 is a man-machine interface such as a keyboard as an example of an input device, and a display as an output device. The communication interface 12 is a common communication means for the apparatus according to the respective aforementioned example embodiments (FIGS. 1, 6, and 8) to communicate with an external apparatus through a communication network 20. In such a hardware configuration, the CPU 11 controls an entire operation of the information processing apparatus 10 providing the learning apparatus (100, 200, 300) according to the respective example embodiments.

For example, the respective aforementioned example embodiments are realized by supplying a program (computer program) capable of realizing the processing described in the respective aforementioned example embodiments to the information processing apparatus 10 illustrated in FIG. 10, and subsequently loading the program into the CPU 11 and executing the program. For example, such a program may be a program capable of realizing the various types of processing described in the flowcharts (FIGS. 5 and 7) referred to in the description of the respective aforementioned example embodiments, or the respective units (respective blocks) illustrated in the apparatuses in the block diagrams illustrated in FIGS. 1, 6, and 8.

Further, the program supplied into the information processing apparatus 10 may be stored in a readable-writable transitory memory (15) or a non-volatile storage device (17) such as a hard disk drive. That is, for example, in the storage device 17, a program group 17A includes programs capable of realizing the functions of the respective units illustrated in the learning apparatus (100, 200, 300) according to the respective aforementioned example embodiments. Further, for example, various pieces of stored information 17B include learning data, parameters, and losses in the respective aforementioned example embodiments. Note that, in implementation of the program into the information processing apparatus 10, a component unit of an individual program module is not limited to allocation of the respective blocks illustrated in the block diagrams (FIGS. 1, 6, and 8) and may be appropriately selected by a person skilled in the art at implementation.

Further, in the case of the description above, currently common procedures as described below may be adopted as a method of providing the program into the apparatus:

A method of installation into the apparatus through various computer-readable recording media (19) such as a compact disc (CD)-ROM and a flash memory, and A method of external downloading through a communication line (20) such as the Internet.

In such a case, the respective example embodiments of the present invention may be viewed as being configured by a code (program group 17A) constituting such a computer program, or a storage medium (19) storing such a code.

The present invention has been described above as examples applied to the aforementioned exemplary embodiments. However, the technical scope of the present invention is not limited to the respective aforementioned example embodiments. It is obvious to a person skilled in the art that various changes or modifications can be made to such example embodiments. In such a case, a new example embodiment with such a change or modification may be included in the technical scope of the present invention. This is obvious from matters described in the appended claims.

This application is based upon and claims the benefit of priority from Japanese Patent Application No. 2015-001271 filed on Jan. 7, 2015, the entire disclosure of which is incorporated herein.

REFERENCE SIGNS LIST

100 Learning apparatus
101 Selection unit
102 Acquisition unit
103 Update unit
104 Calculation unit
105 Comparison unit
106 Output unit
107 Storage unit
200 Learning apparatus
205 Comparison unit
300 Learning apparatus
303 Update unit
304 Calculation unit
305 Determination unit
1 Classifier

What is claimed is:

1. A learning apparatus comprising:
at least one memory storing instructions; and
at least one processor configured to access the at least one memory and execute the instructions to:
select a sample that is likely to be discriminated as a class not being a correct-answer class based on values calculated for each of a plurality of classes by a discriminant function, from one or more samples not assigned with a label, as the sample being a target of labeling;
acquire, when a label is assigned to the sample being the target of labeling, a plurality of samples with labeling including the sample being the target of labeling;
update a dictionary used by a classifier, by using the acquired samples with labeling;
calculate, by using the updated dictionary and the one or more samples a ratio of a sum of loss to a number of the samples with labeling as a loss with respect to all the samples with labeling;
compare a loss calculated by using the updated dictionary and a loss calculated by using the dictionary before updating with respect to all the samples with labeling before adding a new sample with labeling;
update the dictionary by using the samples with labeling added with the new sample with labeling when the loss calculated by using the dictionary before updating is less than the loss calculated by using the updated dictionary by using the samples with labeling added with the new sample with labeling;
terminate labeling work of a correct answer class when a value calculated by dividing the loss calculated by using the updated dictionary by a number of the samples with labeling decreases in inverse proportion to the number of the samples with labeling after the loss calculated by using the updated dictionary increases corresponding to the number of samples with labeling; and
output the updated dictionary to the classifier, the updated dictionary improving data classification by the classifier.

2. The learning apparatus according to claim 1,
wherein, the at least one processor is further configured to execute the instructions to:
when an average of the loss calculated by using the updated dictionary and a predetermined number of past losses is less than an average of a predetermined number of calculated losses before the predetermined number of past losses are calculated, determine not to update the dictionary.

3. The learning apparatus according to claim 1,
wherein, the at least one processor is further configured to execute the instructions to:
calculate a correlation function between a ratio of the number of the samples with labeling to a first number of samples being smaller than the number of the samples with labeling by a predetermined number, and the ratio of the loss when a number of the samples with labeling is the first number of samples to the loss with respect to all the samples with labeling, and, when the correlation function is greater than a predetermined threshold value, determine not to update the dictionary.

4. The learning apparatus according to claim 1, wherein, the at least one processor is further configured to execute the instructions to:
output the dictionary to the classifier when the dictionary is determined not to update.

5. A learning method comprising:
selecting a sample that is likely to be discriminated as a class not being a correct-answer class based on values calculated for each of a plurality of classes by a discriminant function, from one or more samples not assigned with a label, as the sample being a target of labeling;
acquiring, when a label is assigned to the sample being the target of labeling, a plurality of samples with labeling including the sample being the target of labeling;
updating a dictionary used by a classifier by using the acquired samples with labeling;
calculating, by using the updated dictionary and the one or more samples, a ratio of a sum of loss to a number of the samples with labeling as a loss with respect to all the samples with labeling;
comparing a loss calculated by using the updated dictionary and a loss calculated by using the dictionary before updating with respect to all the samples with labeling before adding the new sample with labeling;
updating the dictionary by using the samples with labeling added with the new sample with labeling when the loss calculated by using the dictionary before updating is less than the loss calculated by using the updated dictionary by using the samples with labeling added with the new sample with labeling;
terminating labeling work of a correct answer class when a value calculated by dividing the loss calculated by using the updated dictionary by a number of the samples with labeling decreases in inverse proportion to the number of the samples with labeling after the loss calculated by using the updated dictionary increases corresponding to the number of samples with labeling; and
outputting the updated dictionary to the classifier, the updated dictionary improving data classification by the classifier.

6. A computer-readable non-transitory recording medium storing a program causing a computer to perform:
processing of selecting a sample that is likely to be discriminated as a class not being a correct-answer class based on values calculated for each of a plurality of classes by a discriminant function, from one or more samples not assigned with a label, as the sample being a target of labeling;
processing of acquiring, when a label is assigned to the sample being the target of labeling, a plurality of samples with labeling including the sample being the target of labeling;
processing of updating a dictionary used by a classifier by using the acquired samples with labeling;
processing of calculating, by using the updated dictionary and one or more samples with labeling, a ratio of a sum of loss to a number of the samples with labeling as a loss with respect to all the samples with labeling;
processing of comparing a loss calculated by using the updated dictionary and a loss calculated by using the dictionary before updating with respect to all the samples with labeling before adding the new sample with labeling;
processing of updating the dictionary by using the samples with labeling added with the new sample with labeling when the loss calculated by using the dictionary before updating is less than the loss calculated by using the updated dictionary by using the samples with labeling added with the new sample with labeling;

processing of terminating labeling work of a correct answer class when a value calculated by dividing the loss calculated by using the updated dictionary by a number of the samples with labeling decreases in inverse proportion to the number of the samples with labeling after the loss calculated by using the updated dictionary increases corresponding to the number of samples with labeling; and processing of outputting the updated dictionary to the classifier, the updated dictionary improving data classification by the classifier.

\* \* \* \* \*